Patented Dec. 10, 1940

2,224,387

UNITED STATES PATENT OFFICE 2,224,387

AMINO ALKANOLOXY ARYL ARSENO COMPOUND

Cliff S. Hamilton, Lincoln, Nebr., assignor to Parke, Davis & Company, Detroit, Mich., a corporation of Michigan No Drawing. Application September 2, 1937, Serial No. 162,183

11 Claims. (Cl. 260—444)

The invention relates to amino-substituted aryloxy-alkanol arseno compounds.

The invention is a continuation in part of my application, Serial No. 681,226, filed July 19, 1933, now Patent No. 2,099,686, issued November 23, 1937. In that application there are described new arsenic compounds of the general formula, R—O—R' in which R is an aromatic nucleus having arsenic as a direct substituent. The radical R'—O— of this general formula is an oxyalkanol group which is directly attached to a carbon atom of the aromatic nucleus, R. Application, Serial No. 681,226 also discloses compounds having amino groups, and various substituted amino groups, attached to the aryl nucleus R.

An object of the present invention is to prepare a new class of amino substituted aryloxyalkanol-arseno compounds which may be readily obtained in water-soluble form.

Another object is to provide new therapeutically valuable compositions comprising or consisting of the new compounds of the invention.

I have now found that the above and other desirable objects may be realized by providing compounds of the general formula

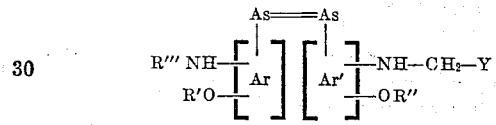

where Ar and Ar' represent aryl nuclei (such as phenyl, naphthyl, etc.), R'O— and R''O— are the same or different oxyalkanol groups, (such as oxyethanol (HOCH$_2$CH$_2$O—),) oxy-$\beta$-propanol (CH$_3$CHOHCH$_2$O—), oxy-$\beta$-$\alpha$-propanediol (HOCH$_2$CHOHCH$_2$O—), oxy-$\alpha$-butanol (CH$_3$CHOHCH$_2$CH$_2$O—), oxy-$\beta$-isopentanol ((CH$_3$)$_2$CH—CHOH—CH$_2$—O—), etc., and R''' is hydrogen or —CH$_2$—Y, where Y is a member of the group, —SOOX, and —SO$_2$—OX, X representing one of the group, hydrogen or a soluble-salt forming basic group or metal.

The new compounds in the form of their salts are soluble in water and both the acid and salt forms are sufficiently stable to be used for pharmaceutical or other purposes, such as intermediates for the preparation of other chemical compositions containing arsenic.

When making the arseno compounds containing the radicals, —CH$_2$—SO$_2$X and —CH$_2$—SO$_3$X, various methods may be used, such as the following:

1. Action of formaldehyde sulfoxylate on an amino substituted aryloxyalkanol arsonic acid.
2. Action of formaldehyde sulfoxylate on an amino substituted aryloxyalkanol arsinoso compound.
3. Action of formaldehyde sulfoxylate on an amino substituted aryloxyalkanol arseno compound.
4. Action of formaldehyde bisulfite on an amino substituted aryloxyalkanol arseno compound.

Methods 3 and 4 may be used in cases where it is desired to produce only a single chemical individual. On the other hand, method 1 may be used where a product of special therapeutic value is desired. Method 1 gives as a product substantially only one chemical individual, or, products which are apparently mixtures of methylene sulfinate with methylene sulfonate (bisulfite derivative), depending upon the proportion of reagents used.

In method 3 where formaldehyde sulfoxylate is used, the sulfoxylate does not reduce the arsenic group of the compound, as in methods 1 and 2, but is substituted directly and in unoxidized form, into the amino groups of the arseno compound. Thus, method 3 yields formaldehyde sulfoxylate arseno compounds where one or more of the amino groups of the arseno compound are substituted by formaldehyde sulfoxylate, depending upon the proportion of formaldehyde sulfoxylate used in the reaction.

In the case of methods 1 and 2, it is possible to obtain almost entirely the methylene sulfonate arseno compound by reacting the calculated quantity of formaldehyde sulfoxylate to exactly reduce the arsonic acid or arsinoso compound to the corresponding arseno compound, with simultaneous oxidation of practically all of the formaldehyde sulfoxylate to bisulfite. However, method 4 is preferred for making the sulfonate arseno compounds and compositions, just as method 3 is preferred for the corresponding sulfoxylate compositions, or sulfinates.

Although method 3 is preferred for the sulfinate arseno compounds, it is also possible, by using sufficient excess of formaldehyde sulfoxylate in methods 1 and 2, to obtain a product consisting largely of the corresponding methylene sulfinate arseno derivative.

The following examples are given by way of illustrating the invention which, however, is not limited to the specific conditions and materials disclosed therein.

EXAMPLE 1.—*Sodium 3,3'-diamino-4,4'-di-$\beta$-hydroxy-propoxy-arsenobenzene-N-methylene-sul-* finate. (Preparation by reaction with an arseno compound.)

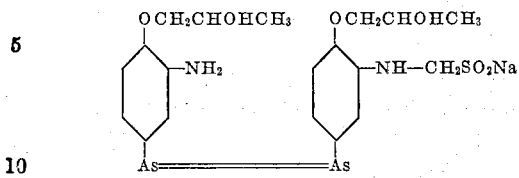

Preparation of the intermediate 3,3'-diamino-4,4'-di-β-hydroxy-propoxy arsenobenzene.

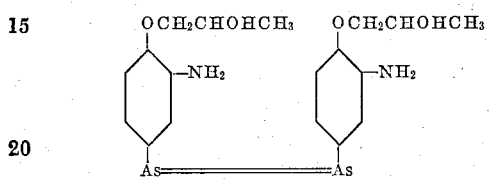

The arsonic acid compound used in making the intermediate of this example is described by Stevinson and Hamilton, J. Am. Chem. Soc. 57: 1600 (Sept.) 1935.

A mixture of 15.5 grams of this arsonic acid compound, 4 - arsono - 2 - amino-phenoxy-β-hydroxy-propane, with 40 cc. of water and 40 cc. of 50% hypophosphorus acid is heated on the water bath until the solution is yellow and forms a soft, gelatinous mass. The reaction mixture is then diluted with 400 cc. of hot water, cooled, ice added, and 6 N sodium hydroxide solution added until the reaction mixture is neutral to litmus. The mixture is then filtered in inert atmosphere and washed with water. The wet arseno product obtained at this point and containing about four or five times its weight of water may be used, as such, in making the soluble compounds of the invention, or it may be isolated as a bright yellow powder by washing thoroughly with alcohol, then ether, and drying in vacuo over phosphorus pentoxide. The yield of arseno compound is practically quantitative.

Analysis shows an arsenic content of 30.6–31.0%. Calculated for $C_{18}H_{24}O_4N_2As_2$: As, 31.1%.

Preparation of the N-methylene-sulfinate derivative.

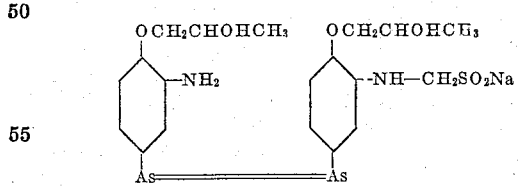

The wet diamino-arseno intermediate product above, weighing about 65 g., is suspended in 125 cc. of air-free water and warmed with 20 grams of freshly recrystallized sodium formaldehyde sulfoxylate by warming at 65–70% for one hour with frequent stirring. The solution is filtered, cooled to 25° C., and made acid with 25 cc. of concentrated HCl. The sulfinic acid which precipitates is washed thoroughly with water and then converted to the sodium salt with the minimum quantity (about 7 cc.) of 6 N sodium hydroxide solution. The sodium salt is precipitated with an ethanol-ether mixture, filtered, washed with alcohol and then with ether and pulled dry on the suction filter under a rubber dam, to exclude excess oxygen of the air. The rubber dam can be a thin soft pure gum and very elastic rubber sheet, which is of the same material as the well known rubber dam used by dentists. The precipitate is then transferred to a vacuum desiccator and dried over phosphorus pentoxide. A light yellow product is thus obtained which may be powdered and then sealed in ampoules under carbon dioxide. It is sodium-3,3'-diamino-4,4'-di-β-hydroxy-propoxy - arsenobenzene - N - methylene sulfinate. The powder dissolves in water to give a light yellow solution from which no precipitate separates, even after standing 24 hours exposed to the air. It is preferred, although not entirely necessary, that all operations of this example be conducted in an inert atmosphere containing as little oxygen as possible.

The average arsenic analysis for the light yellow product of this example is 23.5%. The yield is approximately 13 grams.

EXAMPLE 2.—*Sodium 3,3'-diamino-4,4'-di-β-hydroxy - propoxy-arsenobenzene-N-methylene-sulfinate.* (Preparation by reaction with an arsonic acid compound.)

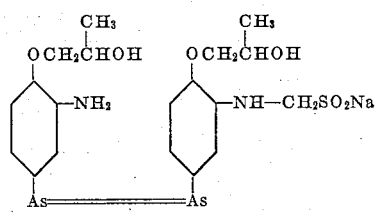

24 grams of the mono-sodium salt of the same 4-arsono-2-amino - phenoxy-β-hydroxy - propane as started with in Example 1, is mixed with 44 grams of freshly recrystallized sodium formaldehyde sulfoxylate, 300 cc. of water and 4 cc. of glacial acetic acid, and the mixture warmed on the water bath with stirring to 60° C., and then heated at 60° with stirring for 45 minutes. During this time the solution develops a pale yellow color. It is then cooled to 25° C., made acid with 50 cc. of concentrated HCl and filtered. After washing thoroughly with air-free water, the residue on the filter is dissolved in the minimum quantity of 6 N sodium hydroxide solution and filtered. The filtrate (100–150 cc.) is then added to a mixture of 300 cc. of methanol and 500 cc. of ether. A precipitate is thereby produced and is filtered, washed with alcohol and ether, and pulled dry under a rubber dam. It is dried in vacuo over $P_2O_5$. About 16–17 grams of light yellow product having the same average arsenic analysis and properties as the product of Example 1 is obtained. All operations of this example are conducted as much as possible in an inert atmosphere, such as an atmosphere of hydrogen or nitrogen gas. The product probably contains small amounts of the disodium 3,3'-diamino-4,4'-di-β-hydroxy-propoxy - arsenobenzene - N,N'-di - methylene-sulfinate and sodium 3,3'-diamino-4,4'-di-β-hydroxy - propoxy - arsenobenzene - N - methylene sulfonate. Where the product of this example is to be used as an intermediate in making other chemical substances, it is for all practical purposes the equivalent of the chemically pure substance or the product of Example 1.

Instead of starting with the mono-sodium salt, the acid compound, 4-arsono-2-amino-phenoxy-β-hydroxy-propane may be used in this example with good results.

EXAMPLE 3.—*Disodium 3,3'-diamino-4,4'-di-β-hydroxy-propoxy-arsenobenzene-N,N'-di-methyl-* ene-sulfinate. (Direct treatment of arseno compound.)

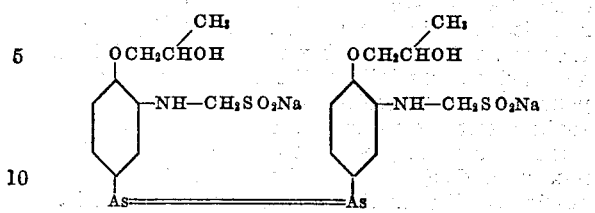

All of the following operations in this example are to be conducted in an air-free atmosphere. A quantity of 133 grams of moist 3,3′-diamino-4,4′-di-β-hydroxy-propoxy - arsenobenzene, prepared as in Example 1 above, is suspended in 54 cc. of air-free water and mixed with 20 grams of freshly recrystallized sodium formaldehyde sulfoxylate. The solid is brought into solution by warming at 65° C. while stirring. The solution is filtered, adjusted to an alkaline pH of about 8 by the addition of 2 N sodium hydroxide solution and then mixed with 10 volumes of ethanol. The mixture so obtained is filtered, washed with alcohol and ether and finally pulled dry under a rubber dam. The product is dried completely in vacuo over phosphorus pentoxide and is light yellow when powdered. 26 grams of product, which is essentially pure disodium 3,3′-diamino-4,4′-di-β-hydroxy - propoxy - arsenobenzene-N,N′-di-methylene-sulfinate, is obtained. It analyzes 21% arsenic.

EXAMPLE 4.—*Disodium 3,3′-diamino-4,4′-β-hydroxy-propoxy-arsenobenzene - N,N′-di - methylene-sulfinate.* (By reduction of the arsonic acid compound.)

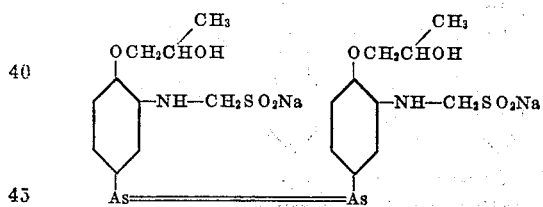

A quantity of 17 grams of 4-arsono-2-aminophenoxy-β-hydroxy-propane, mentioned under Example 1 above, is mixed in 190 cc. of water with 30 grams of freshly recrystallized sodium formaldehyde sulfoxylate and the mixture warmed for one hour at 60–70° C. with stirring. The mixture is filtered into 3 liters of alcohol to form a precipitate which is filtered off, washed with alcohol and ether and then completely dried in vacuo over phosphorus pentoxide. 15 grams of product analyzing 19.0% arsenic is obtained which is a dense, light yellow solid dissolving readily in water. It can then be sealed in ampoules under nitrogen. The product of this example probably consists of a mixture of approximately 75% of disodium 3,3′-diamino-4,4′-di-β-hydroxy-propoxy-arsenobenzene-N,N′-di-methylene sulfinate and about 25% of the corresponding methylene sulfonate compounds.

Much less of the methylene sulfonate compound is present in the final product if this example is carried out on the arsenoxide corresponding to 4-arsono-2-amino-phenoxy-β-hydroxy-propane.

Good results may also be obtained in this example by starting with the sodium salt of 4-arsono-2-amino-phenoxy-β-hydroxy-propane instead of the acid from which the sodium salt is derived.

EXAMPLE 5.—*Sodium 3,3′-diamino-4,4′-di-β-hydroxy-propoxy - arsenobenzene - N - methylene sulfinate.* (By reduction of the oxide.)

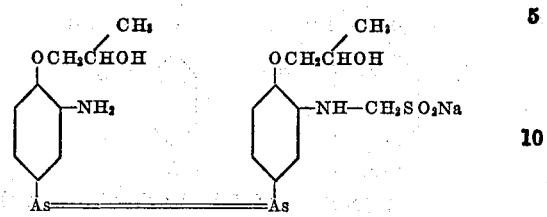

This product is obtained by a reaction on 4-arsinoso- 2 -amino-phenoxy- β -hydroxy-propane analogous to that used in Example 2 on 4-arsono-2-amino-phenoxy-β-hydroxy-propane. However, the product contains less of the corresponding methylene sulfonate compound than is present in the product of Example 2, because the arsenoxide used in the reaction converts much less of the formaldehyde sulfoxylate present into methylene sulfonate compound than is the case with the corresponding arsonic acid in Example 2 and, therefore, much less of the sodium 3,3′-diamino-4,4′ - di - β - hydroxy -propoxy-arsenobenzene-N-methylene-sulfonate compound is produced. About one-half as much methylene sulfonate substituted compound is present in the final product of this example as is present in the product of Example 2. The 4-arsinoso-2-amino-phenoxy-β-hydroxy-propane used in this example is obtained by reduction of the corresponding arsonic acid compound, e. g., by using hydriodic acid and sulfur dioxide as described in my application, Serial No. 681,226.

EXAMPLE 6.—*Disodium 3,3′-diamino-4,4′-di-β-hydroxy - propoxy-arsenobenzene-N,N′-di-methylene-sulfonate.* (Direct treatment of arseno compound.)

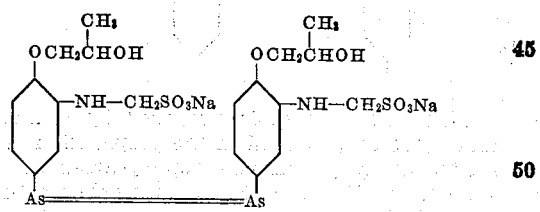

A quantity of 190 grams of the wet 3,3′-diamino - 4,4′ - di - β-hydroxy-propoxy-arsenobenzene, prepared as described under Example 1 above, is suspended in 200 cc. of water containing 30 grams (3 molecular equivalents) of sodium formaldehyde bisulfite. The mixture is heated at 80–85° C. with stirring for about two hours in an atmosphere of carbon dioxide. It is then filtered, using super-cel if necessary in order to produce a clear solution, and precipitated with 5 volumes of absolute alcohol. After washing and drying, the product can be powdered and is a light cream colored powder weighing 31.5 grams. The powder may be stored by sealing in ampoules under nitrogen. It consists of disodium 3,3′-diamino-4,4′-di-β-hydroxy-propoxy-arsenobenzene- N,N′-di-methylene-sulfonate containing some of the corresponding N-monomethylene sulfonate compound and analyzes 19.2% total arseno arsenic, as determined by the usual iodine titration method. The calculated value for the di-substituted compound is 20.9% arsenic.

EXAMPLE 7.—*Mono-sodium 3,3'-diamino-4,4'-di-β-hydroxy-propoxy-arsenobenzene-N-methylene-sulfonate.*

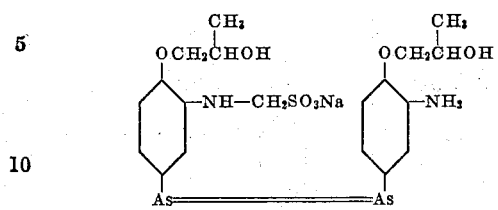

A 2 gram quantity of the di-substituted methylene sulfonate compound of Example 6 is dissolved in water and made acid with dilute hydrochloric acid. There is a delayed precipitation of the desired compound in the form of a yellow material. The precipitate is thoroughly washed with water and dried in vacuo over phosphorus pentoxide. The mono - N - methylene-sulfonate obtained is orange-yellow and may be readily powdered. A yield of 1 gram is obtained. An arsenic analysis gives 25.0%. The mono-sodium salt of this compound is obtained by dissolving the latter in the minimum quantity of Normal NaOH solution, filtering and precipitating with 6 volumes of alcohol.

EXAMPLE 8.—*Sodium 3,3'-diamino-4,4'-di-(α-hydroxy - propoxy)-arsenobenzene-N-methylene-sulfinate.*

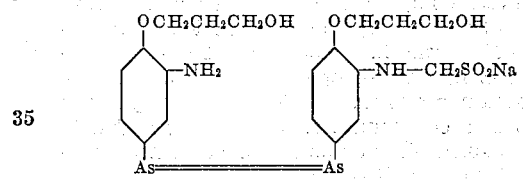

Preparation of the intermediate 3,3'-diamino-4,4'-di-(α-hydroxy-propoxy)-arsenobenzene.

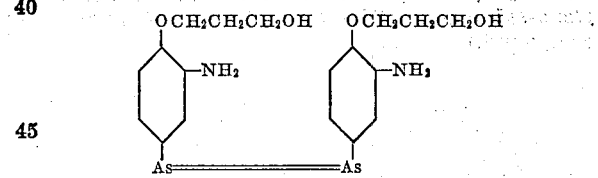

This intermediate is prepared by a method analogous to that used in the preparation of the intermediate β-hydroxy-propoxy-arsenobenzene compound of Example 1. One may start with the hydrochloride of α-2-amino-4-arsono-phenoxy-propanol, prepared as described by Sweet and Hamilton, Jour. Amer. Chem. Soc., vol. 56, page 2409 (Nov.) 1934. The hydrochloric acid of the hydrochloride can be exactly neutralized by an alkaline solution and the α-2-amino-4-arsono-phenoxy-propanol free base crystallized or separated from the solution.

The α - 2 - amino- 4 -arsono-phenoxy-propanol free base is reacted with hypophosphorus acid, the reaction mixture neutralized with alkali, filtered, washed and dried, as for the corresponding compound of Example 1. The solid product thus obtained is 3,3' - diamino - 4,4' - di -(α-hydroxy-propoxy)-arsenobenzene.

Preparation of the N-methylene sulfinate derivative.

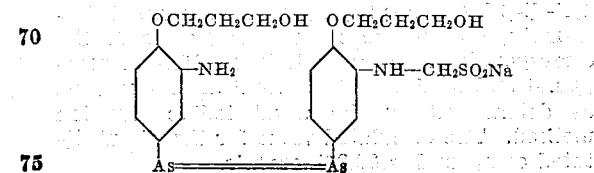

As in Example 1, and using corresponding quantities of reactants, the intermediate 3,3'-diamino-4,4'-di-(α-hydroxy-propoxy)-arsenobenzene is reacted with sodium formaldehyde sulfoxylate, the reaction mixture filtered and then acidified to precipitate the sulfinic acid compound, which is finally converted to the desired sodium salt by means of alkali. The sodium salt may also be precipitated with ethanol-ether mixture and separated, as for the product of Example 1. All operations are conducted in an inert atmosphere. The product of this example analyzes 23.4% of arsenic and is a light solid similar to the product of Example 1.

EXAMPLE 9.—*Sodium - 3,3'- diamino-4,4'-di-β-methyl - β - hydroxy - ethoxy arsenobenzene - N - methylene sulfinate.* (By reduction of the arsonic acid compound.)

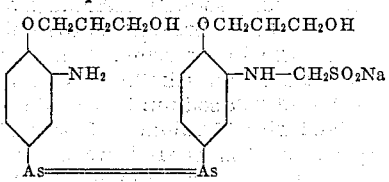

Following the procedure of Example 2, the mono-sodium salt of α-2-amino-4-arsono phenoxy propanol is reacted with sodium formaldehyde sulfoxylate and the resulting arseno product then separated, reprecipitated as the sodium salt and dried. The dry solid product gives an arsenic analysis substantially as calculated for $C_{19}H_{25}O_6N_2As_2Na$.

EXAMPLE 10.—*Di-sodium-3,3'-diamino-4,4'-di-α-hydroxy-propoxy-arsenobenzene-N,N'-dimethylene sulfinate.* (Direct treatment of the arseno compound.)

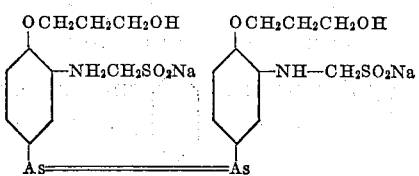

Operating as in Example 3, corresponding quantities of the arseno intermediate of Example 8 are treated directly with sodium formaldehyde sulfoxylate. The product is also separated and dried by the same procedure as used in Example 3. It is a solid having an arsenic percentage as called for by the formula $C_{20}H_{26}O_8N_2As_2Na_2$.

EXAMPLE 11.—*Di-sodium-3,3'-diamino-4,4'-di-α-hydroxy-propoxy-arsenobenzene-N,N'-dimethylene sulfinate.* (Reduction of the arsonic acid compound.)

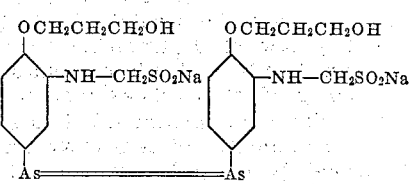

This example is carried out on the free base of α-2-amino-4-arsono phenoxy propanol by a procedure exactly analogous to that used in Example 4, where 4-arsono-2-amino phenoxy β-hydroxy propane was started with. The product is equivalent to that of Example 10 and has the same arsenic analysis.

Corresponding to Example 4, much less methylene sulfite compound is present in the final product of this example if it is carried out on the arsenoxide corresponding to α-2-amino-4-arsono phenoxy propanol.

EXAMPLE 12.—*Sodium-3,3'-diamino-4,4'-di - α - hydroxy-propoxy - arsenobenzene - N - methylene sulfinate.* (By reduction of the arsenoxide.)

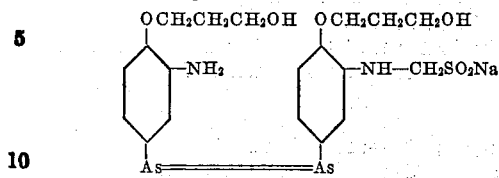

The general procedure of Example 5 is followed in this example, wherein α-2-amino-4-arsinoso-phenoxy propanol is reduced with formaldehyde sulfoxylate. As in Example 5, the oxide (arsinoso compound) used in this example can be obtained by reducing the corresponding arsonic acid compound of Stevinson and Hamilton described in Example 8, for example, by using hydriodic acid and sulfur dioxide.

EXAMPLE 13.—*Di-sodium-3,3'-diamino-4,4'-di-(α-hydroxy-propoxy) - arsenobenzene - N,N'- di - methylene sulfonate.* (Direct treatment of the arseno compound.)

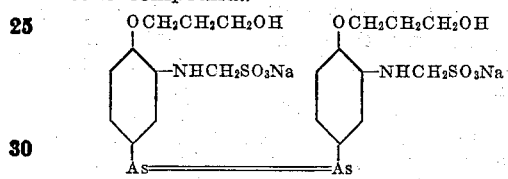

Following the same general procedure as given for Example 6, 3,3'-diamino-4,4'-di-(α-hydroxy-propoxy)-arsenobenzene is reacted directly with sodium formaldehyde bisulfite. The product of this example is then precipitated, separated and dried by using the same steps as for the product of Example 6.

EXAMPLE 14.—*Sodium - 3,3' - diamino-4,4'-di-(α-hydroxy-propoxy) - arsenobenzene-N-methylene sulfonate.*

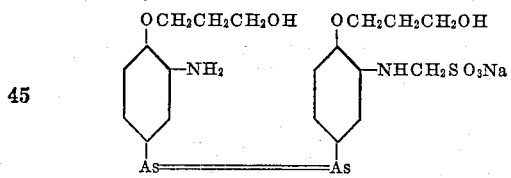

Following the procedure of Example 7, this compound is made by acidification of the di-substituted methylene sulfonate compound of Example 13.

EXAMPLE 15.—*3,3' - diamino-4,4'-di - (β, α-dihydroxy-n-propoxy)-arsenobenzene and its water-soluble derivatives.*

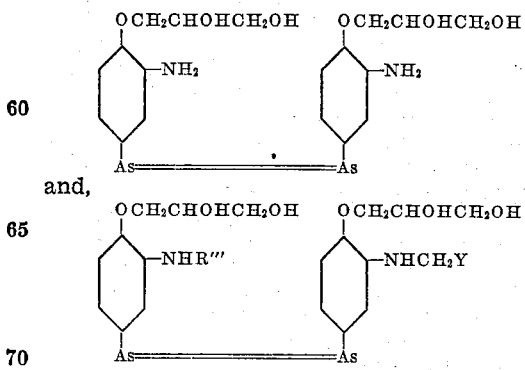

R''' is a member of group, hydrogen and —CH₂Y.

Y is a member of group, —SO₂X, and —SO₃X.

X is a member of group, H and a soluble-salt forming basic group or metal.

Preparation of the intermediate mono-sodium salt of 2-amino-4-arsono-phenoxyglycerol,

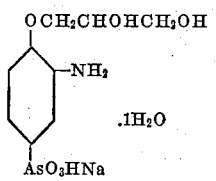

218 grams (1 mol) of p-hydroxyphenylarsonic acid is dissolved in 750 cc. of 6 N sodium hydroxide solution and this solution cooled to 20° C. To this is added 167 cc. (2 equivalents) of glycerol-α-monochlorohydrin. The solution is refluxed for 4 hours, filtered hot and cooled to 20° C. Addition of 200 cc. of 12 N hydrochloric acid makes the solution just acid to Congo red paper. The solution is diluted to 2½ liters and hot barium hydroxide solution added while it is mechanically stirred until no more of the barium salt of 4-arsono-phenoxyglycerol is precipitated from solution. This barium salt is filtered off and dried as well as possible with the suction filter. The barium salt is suspended in 2 liters of boiling water (the salt is more soluble in hot water than in cold). To this suspension is added 1 N sulfuric acid while it is mechanically stirred and kept as near the boiling point as possible. This removes the barium ion as barium sulfate and when the solution is just acid to Congo red paper the addition of acid is stopped. The barium sulfate is then removed by filtration through a charcoal mat. The solution is concentrated under reduced pressure to about 250 cc., poured into an evaporating dish and concentrated to a thick syrup over a steam bath, then placed in the vacuum oven at 70° C. until the product is completely dried. The resulting product contains some inorganic salts and the yield of 4-arsono-phenoxyglycerol is 55–60% of theory.

Pure 4-arsono-phenoxyglycerol is obtained by extraction with hot methyl cellosolve and addition of isopropyl ether to the resulting solution to throw out the desired product. The white solid is filtered, washed with a little acetone and dried in the vacuum oven at 70° C. for 4 hours. The solid particles have no definite shape and do not melt below 250° C.

Anal. found, 25.69, 25.73% As; calc. for $C_9H_{13}O_6$, As, 25.67% As. Analysis shows that it takes up no water of hydration on exposure to the air.

Thirty grams of 4-arsono-phenoxyglycerol is added to 90 cc. of fuming nitric acid sp. gr. 1.495) which is cooled in an ice bath and mechanically stirred. It is added over a period of 30 minutes and stirring is continued for 3 hours. At the end of this time the solution is poured into 600 cc. of cold water. The nitro ester separates first as an oil which solidifies almost immediately. After cooling in an ice bath for 4 hours the solid ester is filtered off. The ester is dissolved in 3 liters of boiling water and the hot solution filtered through a hot water funnel. It is cooled until crystallization is complete, filtered, and the ester dried in the air for 2 days. The product is in the form of tiny yellow plates; M. P. 132–3° C. Yield is 75–80% of theory.

Anal. found, 17.35, 17.41% As; calc. for $C_9H_{10}N_3$ As, 17.57% As.

Fifty grams of 2-nitro-4-arsono-phenoxyglycerol dinitrate is placed in a 500 cc. round-bottom flask fitted with a reflux condenser. To it is added 200 cc. of 3 N sulfuric acid and the solution refluxed for 3 hours. It is diluted to 600 cc., and the sulfate ion removed by the addition of hot barium hydroxide solution while it is mechanically stirred. When the addition of a drop of barium hydroxide solution or of sulfuric acid produces no precipitate of barium sulfate, the solution is filtered through a charcoal mat and concentrated to dryness under reduced pressure with heating over a steam bath. The 2-nitro-4-arsono-phenoxyglycerol is extracted with 150 cc. of boiling ethylene glycol monomethyl ether. This hot solution is filtered into 500 cc. of cold synthetic methyl alcohol. The product comes down as a light yellow powder. It is filtered and dried in the vacuum oven at 70° C., again extracted with 200 cc. of boiling ethylene glycol monomethyl ether and the hot solution filtered into 500 cc. of cold synthetic methyl alcohol. The product is filtered and dried in the vacuum oven at 70° C.; yield, 55–60% of theory. It is a light yellow powder which does not melt below 250° C.

Anal. found, 22.06, 22.13% As; calc. for $C_9H_{12}O_8N$ As, 22.24% As.

3.37 grams (.01 mol) of 2-nitro-4-arsono-phenoxyglycerol is dissolved in 3 cc. of water. 35 cc. of 95% ethyl alcohol and 1 gram activated Raney catalyst is then added to the solution and the catalytic reduction carried out by means of hydrogen under 45 pounds pressure. After 45 minutes the required pressure drop is noted and the bottle containing the solution removed, cooled in an ice bath, and filtered into a 50 cc. filter flask cooled in an ice bath. This solution is added dropwise to 350 cc. of diethyl ether which is mechanically stirred and cooled in an ice bath. The amine separates as a very light brown solid having no definite crystalline form. After allowing the solid to settle, the supernatant liquid is decanted from it and the amine washed with a little diethyl ether. A stream of carbon dioxide is played over the amine during filtration of the solution and while removing it from the funnel. It is placed in the vacuum desiccator where it is dried over sodium hydroxide sticks for 24 hours.

Anal. found, 24.02, 23.90% As; calc. for $C_9H_{14}O_6N$ As, 24.43% As.

6.74 grams (0.2 mol) of 2-nitro-4-arsono-phenoxyglycerol is mixed with 1.06 g. (.01 mol) of anhydrous sodium carbonate and to this mixture is added 22 cc. of water. As soon as the solid has all dissolved the Raney catalyst is added and the reduction carried out. After 30 minutes the required pressure drop is noted. The solution is cooled in an ice bath and then filtered into a 50 cc. filter flask which is cooled in an ice bath. This solution is then added dropwise to 500 cc. of absolute ethyl alcohol which is cooled in an ice bath and stirred mechanically. The sodium salt separates in the form of tiny granules which are very nearly white. Stirring is continued for 30 minutes and the solid filtered off as rapidly as possible with a suction filter and washed with a little cold absolute ethyl alcohol and dried in a vacuum desiccator over sodium hydroxide sticks for 24 hours. The yield is 71% of theory. If the product is slightly colored, it may be dissolved in 15 cc. of water, filtered and added dropwise to 400 cc. of absolute alcohol which is cooled in an ice bath and stirred mechanically. The salt is filtered off and dried for 24 hours in a vacuum desiccator. The product is then practically white.

Anal. found, 21.48, 21.42% As; calc. for $C_9H_{13}O_6N$ As Na, 1 $H_2O$, 21.61% As.

When heated at 110° C. for 16 hours, the following analysis is obtained:

Anal. found, 22.44, 22.62% As; calc. for $C_9H_{13}O_6N$ As Na, 22.79% As.

This indicates that the salt contains one molecule of water of hydration when dried over sodium hydroxide in a vacuum desiccator.

Preparation of 3,3'-diamino-4,4'-di-(β,α-dihydroxy-n-propoxy)-arsenobenzene.

5 grams of 2-amino-4-arsono-phenoxyglycerol mono-sodium salt, 15 cc. of water and 15 cc. of 50% hypophosphorus acid ($H_3PO_2$) are mixed together in a suitable reaction vessel, and heated on a water bath until the solution is yellow and forms a soft gelatinous mass. The reaction mixture is then diluted with 400 cc. of hot water, cooled, ice added and then 6 N sodium hydroxide solution added until the mixture is neutral to litmus. The mixture is then filtered in an inert atmosphere and washed with air-free water. The wet 3,3'-diamino-4,4'-di-(β,α-dihydroxy-n-propoxy)-arsenobenzene remaining on the filter weighs 20 to 25 grams. It is of sufficient purity that it may be used directly and while wet for the preparation of the methylene sulfite, sulfinate and carboxylate solubilized derivatives of the invention.

The dry 3,3'-diamino-4,4'-di-(β,α-dihydroxy-n-propoxy)-arsenobenzene product is isolated as a bright yellow powder by washing the above mentioned wet product with alcohol, then with ether, and drying in vacuo over $P_2O_5$. The yield is practically quantitative.

Analysis: Found, 28.7–29.0% As; calculated for $C_9H_{12}O_3N$ As, 29.1% As.

Preparation of water-soluble derivatives of 3,3'-diamino-4,4'-di-(β,α-dihydroxy-n-propoxy)-arsenobenzene.

These are made by methods analogous to those of Examples 1, 3, 6 and 7 when starting with the arseno compound, 3,3'-diamino-4,4'-di-(β,α-dihydroxy-n-propoxy)-arsenobenzene. Applying the methods of Examples 1 and 3 gives the mono- and the di-methylene sulfinate soluble derivatives. Applying the methods of Examples 6 and 7 gives the di- and mono-methylene sulfite soluble derivatives. By starting with the corresponding arsonic acid, 2-amino-4-arsono-phenoxyglycerol, or its salt and applying methods as in Examples 2 and 4, the same soluble compounds are obtained as mentioned above when using the methods of Examples 1 and 3 on the arseno compound.

By starting with the arsinoso compound (arsenoxide) corresponding to the above described 2-amino-4-arsono-phenoxyglycerol and applying the method of Example 5, sodium 3,3'-diamino-4,4'-di-(β,α-dihydroxy-n-propoxy)-arsenobenzene-N-methylene sulfinate is obtained. The arsinoso compound is prepared by reduction of the corresponding arsonic acid. For example, the arsonic acid may be reduced by means of hydriodic acid and sulfur dioxide as mentioned for analogous compounds under Example 5.

The above examples are merely illustrative and numerous other variations of the invention can be carried out in accordance with the general description given. Compounds included in the invention are those having any variations of relative positions in the aryl nucleus of the oxyalkanol groups, the solubilized amino groups (—NH—CH$_2$Y), and the arseno arsenic groups. Such compounds may also possess additional amino groups or other substituents in the aryl nucleus. For instance, solubilized arseno compounds corresponding to the following formula are made by methods analogous to those used in the examples given:

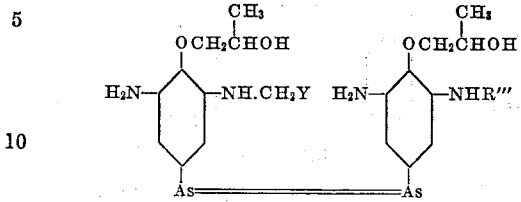

Y and R''' of this formula have the same significance as in the general formula given above.

Specific examples of other compounds coming within the purview of the invention and which may be mentioned are the solubilized arseno derivatives made from 3-amino-5-(β-methylethoxy)-arsonic acid and having the general formula:

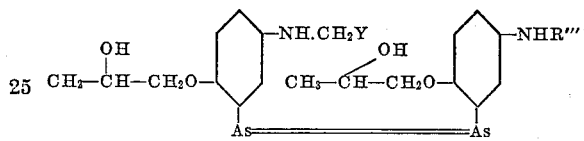

Although for purposes of obtaining chemical intermediates it is possible to isolate the pure compounds, as given in the above examples, it is often advisable to produce a mixture of solubilized arseno derivatives containing bisulfite compound mixed with varying proportions of the corresponding sulfoxylate derivative, since such mixtures are occasionally more effective therapeutically than are the pure compounds when used alone. For example, in those cases where the reducing agent, formaldehyde, sulfoxylate, reduces an arsonic acid or an arsinoso compound to the corresponding arseno compound, varying quantities of sulfoxylate are oxidized to formaldehyde bisulfite, depending upon the relative amount of formaldehyde sulfoxylate used in the reaction. This formaldehyde bisulfite produced during the reaction can also react with some of the arsenic compounds present to produce derivatives containing the formaldehyde bisulfite radical as well as the formaldehyde sulfoxylate radical.

The carbon chains of the oxy-alkanol radicals of the new compound may be straight or branched.

Other liquids than water may be used as a menstruum in which to carry out the reactions. Glycols, glycerine and the like organic solvents may be used also, either alone or mixed with one another or with water.

What I claim as my invention is:

1. Amino-substituted aryl-oxy-alkanol-arseno compounds of the following formula

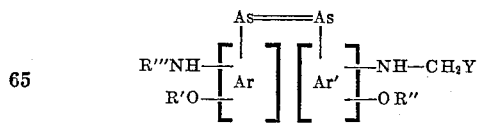

where Ar and Ar' are aryl nuclei, R'O— and R''O— are oxy-alkanol groups containing not more than 5 carbon atoms, and R''' is a member of the group consisting of H and —CH$_2$Y, wherein Y is a member of the group consisting of —SO$_2$X and —SO$_3$X, X representing a member of the group consisting of H and a soluble-salt forming basic group.

2. Amino-substituted aryl-oxy-alkanol-arseno compounds of the following formula

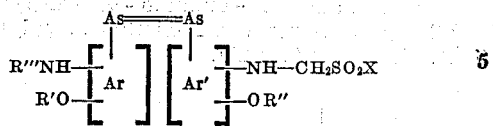

where Ar and Ar' are aryl nuclei, R'O— and R''O— are oxy-alkanol groups containing not more than 5 carbon atoms, and R''' is a member of the group consisting of H and —CH$_2$SO$_2$X, X representing a member of the group consisting of H and a soluble-salt forming basic group.

3. Amino-substituted phenoxy-alkanol-arseno compounds of the formula

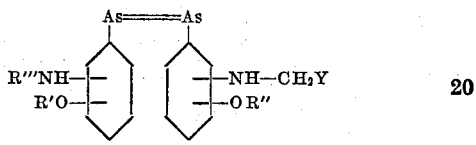

where R'O— and R''O— are oxy-alkanol groups containing not more than 5 carbon atoms, and R''' is a member of the group consisting of H and —CH$_2$Y, wherein Y is a member of the group consisting of —SO$_2$X and —SO$_3$X, X representing a member of the group consisting of H and a soluble-salt forming basic group.

4. Diamino-di-(hydroxy alkoxy)-arseno benzene methylene sulfinates having at least one hydroxy alkoxy group having not more than five carbon atoms and at least one amino group in each benzene nucleus with a methylene sulfinate group attached to at least one of the two amino groups.

5. Amino-substituted phenoxy-alkanol-arseno compounds of the formula

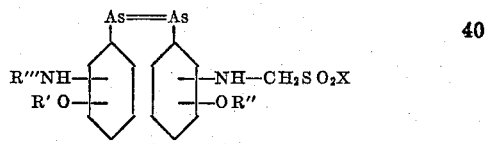

where R'O— and R''O— are oxy-alkanol groups containing not more than 5 carbon atoms, and R''' is a member of the group consisting of H and —CH$_2$SO$_2$X, X representing a member of the group consisting of H and a soluble-salt forming basic group.

6. A 3,3'-diamino-4,4'-di-β-hydroxy propoxy-arsenobenzene-N-methylene sulfinate of the formula

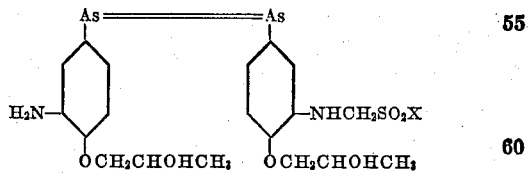

where X is a member of the group consisting of H and a soluble-salt forming basic group.

7. Sodium - 3,3' - diamino - 4,4' -di-(β-hydroxy propoxy)-arsenobenzene-N-methylene sulfinate.

8. Process for the preparation of solubilized derivatives of di-amino-di-(hydroxyalkoxy)-arsenobenzene compounds which comprises reducing with formaldehyde sulfoxylate a compound of the class consisting of amino-substituted phenoxyalkanol arsonic acids and their corresponding arsinoso compounds.

9. Process for the preparation of 3,3'-diamino-4,4' - di - β - hydroxy-propoxy-arsenobenzene-N-methylene sulfoxylate which comprises reacting formaldehyde sulfoxylate with 4-arsono-2-amino-phenoxy-β-hydroxy-propane.
10. Sodium 3,3' - diamino - 4,4'-di-β-hydroxy-ethoxy-arsenobenzene-N-methylene-sulfinate of the following formula,
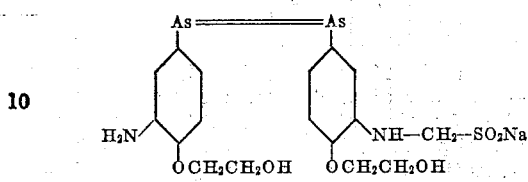
11. Disodium 3,3'-diamino-4,4'-di-β-hydroxy-ethoxy - arsenobenzene - N,N'-di-methylene-sulfonate of the following formula,
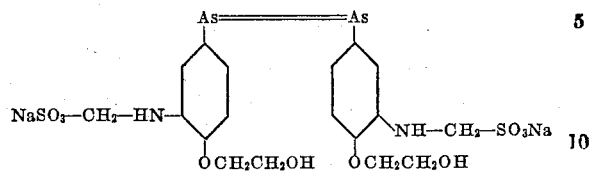
CLIFF S. HAMILTON.